Aug. 8, 1933.    T. H. ALDRICH, JR    1,921,306
PROCESS FOR CONCENTRATING ORES AND OTHER MINERAL AGGREGATES
Filed Nov. 25, 1929
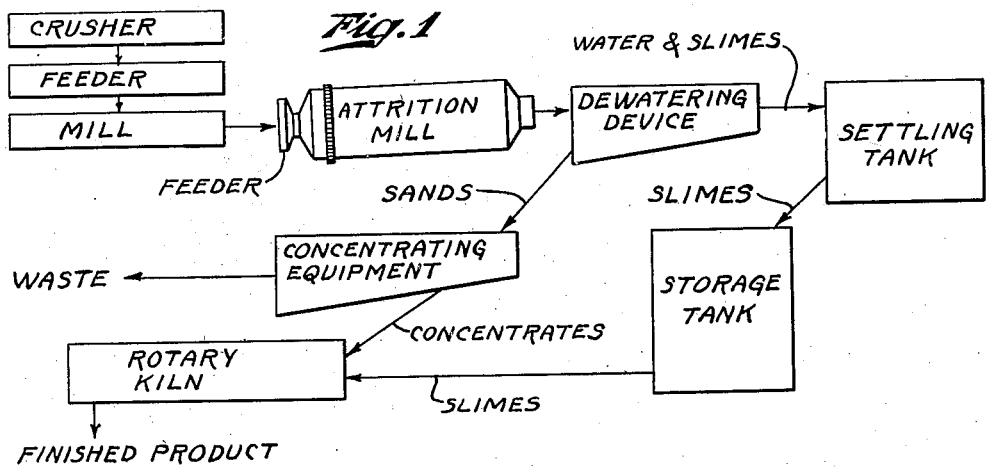
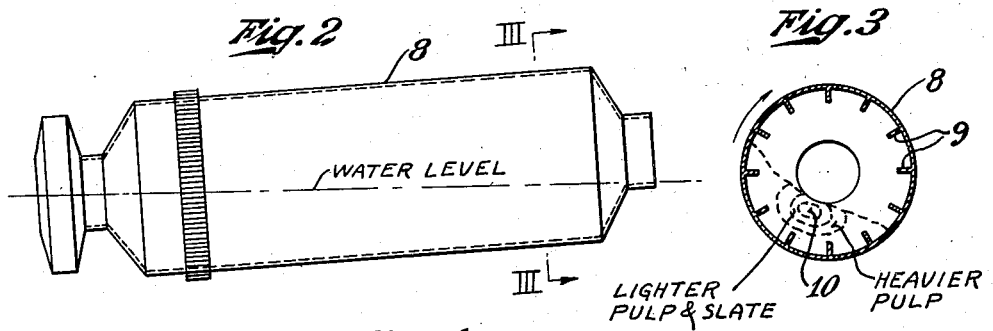
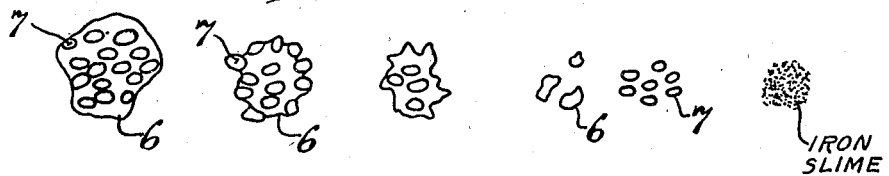
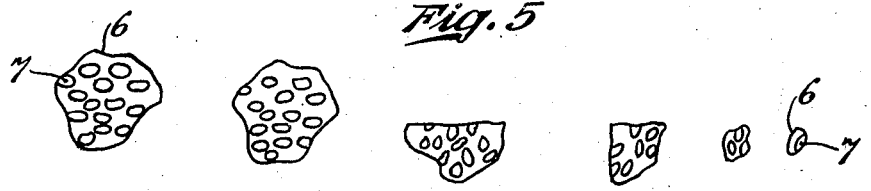
INVENTOR
T. H. Aldrich Jr.
BY
Johnston & Jennings
ATTORNEYS Patented Aug. 8, 1933

1,921,306

UNITED STATES PATENT OFFICE 1,921,306

PROCESS FOR CONCENTRATING ORES AND OTHER MINERAL AGGREGATES

Truman H. Aldrich, Jr., Birmingham, Ala.

Application November 25, 1929
Serial No. 409,562

13 Claims. (Cl. 209—6)

My invention relates to a process for the separation by attrition and/or classification of mineral aggregates into components differing in hardness, specific gravity or co-efficients of wear.

Heretofore, in the reduction and separation of various mineral aggregates, the practice has been to reduce the size of the mineral under treatment by a fractionating method which is accomplished either by grinding or by such a manipulation of the mineral as to reduce the whole mass to small size particles, the several particles as the reduction proceeds maintaining substantially the same relative proportions of hard and soft material therein.

While the above method is entirely satisfactory for many purposes, nevertheless, it is not a desirable or practicable method in many instances as, for illustration, where it is desired to separate the iron values from an aggregate consisting of particles of silica, slate and lime embedded in a matrix of softer iron ore, it has heretofore been practically impossible, by any other method than that which forms the subject matter of this invention, to recover the iron ore in any state approaching purity.

The primary purpose of my invention, briefly defined, is to develop a novel attrition process, by means of which an aggregate composed of soft and relatively hard particles can be treated to wear off the soft particles without materially reducing the hard particles, thereby permitting the latter in the case of iron ore to gradually disengage themselves from the diminishing soft iron matrix until at the conclusion of the process we have, on the one hand, the unreduced particles of silica and lime, and, on the other hand, the separated and reduced iron matrix in the form of small particles and a slime or dust.

A further object of my invention is to effect such a reduction of material, as is above generally described, by a process wherein the attrition is utilized to wear away the softer component is obtained by causing the material to cascade or fall upon itself with the length of free flight or fall of its particles so related to their size or weight that the harder component, which it is desired to reject, will be neither fractured nor appreciably worn.

A further object is to devise a successful and economic method for the beneficiation of low grade iron ores, such as the oolitic silicious iron ores which abound in Alabama, and especially ores, like Clinton red iron ore, which contain, among other impurities, slate that slimes too freely so that it contaminates the slime concentrate.

This I accomplish by carrying out the attrition process by a tumbling action in a rotary attrition mill wherein the crushed ore stock is raised by lifters and projected or caused to cascade across the diameter and fall upon itself with only the necessary force to erode its softer component and form a pulp of such specific gravity that the particles of slate, due to their low specific gravity, will tend either to float thereon or sink therethrough so slowly that they will not be often lifted by the mill lifters but will tend to flow rapidly through the mill, practically unreduced, as a central core in the agitated pulp. Thus, my process contemplates the selective application of attrition to the various softer components of the stock caused by the regulated fall of the stock upon itself to attain novel and highly advantageous results. The peripheral speed of the attrition mill, the number, width and disposition of the lifting blades and the viscosity and density of the pulp are variables in obtaining the desired selective application of attrition to the mineral components in the mill.

My invention further contemplates that, after separating the ore in the manner described into its component minerals, the coarser particles shall be treated on tables or otherwise so as to reject the silicious oolitic grains, lime in the form of the remains of marine life which contains phosphorus, and other like objectionable components which will vary with the material under treatment. The iron values thus recovered in two forms, one exceedingly fine as a clean slime, and the other coarser, as table concentrates, will be in the requisite physical condition for the production therefrom of porous unglazed nodules.

My invention further covers the novel features of construction in the attrition mill for the reduction of the mineral aggregates in accordance with my present process.

In the accompanying drawing I show in Fig. 1 a flow sheet illustrating the preferred manner of carrying my present process into effect.

In Figs. 2 and 3 I have shown respectively longitudinal elevational and transverse sectional views of an attrition mill suitable for the reduction by my present process of red hematite iron ore, but it will be understood that the design of the illustrated apparatus may be appropriately modified for treating different materials.

In Fig. 4 I illustrate, in a series of coordinated views, the manner in which a particle of ore is reduced by my process to its component minerals.

In Fig. 5 I illustrate by a corresponding series of views the manner in which such a particle of ore has heretofore been reduced by the ordinary grinding or fractionating methods.

Inasmuch as I shall illustrate my process by describing its application to the treatment of the low grade red hematite ores of the Birmingham district, their characteristics and component elements require brief description.

The red hematite ores of the Birmingham district were deposited originally as a ooze or precipitate out of the ocean. As the sea water carried an appreciable amount of mud or aluminous clay, probably in the form of kaolinite, the iron precipitate, as it settled through the water, gathered more or less of this aluminous material and carried it down with it. These tiny precipitates of iron and aluminous matter became intermingled on the ocean floor with the sand grains and lime in the form of the remains of marine organisms, such as trilobites, corals, etc., and the mass gradually became bonded together by lime in the form of calcite. The lime in the form of marine life remains has no bonding power, and is objectionable in that it carries with it a large percentage of the phosphorus found in the ore.

Today, therefore, we find the iron oxide filling the cavities and interstices in and between the sand grains and fossil remains, or as a coating completely covering the smaller sand grains and forming oolites,—the entire mass cemented by lime in the form of calcite. The aluminous material is similarly deposited.

It is obvious, therefore, that the first step in the beneficiation of an ore having its components thus intimately associated and closely bonded, is the separation, as nearly as possible, of the whole into its component parts.

The crushing of such an ore, unless carried to a point of extreme fineness, will fail to accomplish this separation, but will merely divide the material into a larger number of smaller units, each containing more or less the same relative components of the larger mass, as is graphically illustrated in Fig. 5, but the calcite bond in the ore is comparatively soft and will erode freely. This makes it possible, by my proposed process of attrition, to wear off this bonding material, thus liberating the iron grains without breaking the sand grains. This method more closely approaches the separation of the whole into its component parts than any other and is graphically illustrated in Fig. 4. In Figs. 4 and 5, the iron matrix representing the soft mineral is indicated at 6 and the hard material by the grains 7.

The process I have developed consists of crushing the raw ore in a ball mill or with rolls to quarter inch or under, which is larger than the largest sand grains; then running it through an attrition mill, which wears away the soft iron coating so as to leave the sand grains intact with the iron scoured off from their surfaces, and rounds up the larger particles of clean iron ore so as to make them work better on the table surface. After this separation by coarse grinding, followed by the attrition or scouring action, the whole is then separated by an ordinary drag type trough separator, in which the slimes overflow a lip and the sands are dragged from the bottom of the trough. These sands go to tables for further treatment and are in ideal condition for a clean separation, because the sand is whole and clean and is separated from the iron and the iron is removed from the sand not by crushing but by wearing it off. The sand, which was originally sea beach sand, is round and tables well, if unbroken.

Concentrates from the table can be sent to the furnace direct or otherwise utilized. The middlings can either go with the concentrates or be returned to the mill stream for retreatment. It is possible that the tailings can be used for various purposes for which low grade sand could be used, such as certain grades of concrete, pig beds, locomotive sand, or can be sluiced into the mine to fill rooms so as to permit a further extraction of pillars, as is common in the Pennsylvania anthracite fields. The above procedure is graphically illustrated on the flow sheet.

As my preferred attrition mill, I employ a revolving cylinder 8 having attached to the inner periphery any suitable type of lifting paddles 9 adapted to engage the particles of heavier specific gravity which settle through the pulp or mass of material in the cylinder sufficiently to enter their path and to lift them above the tumbling mass of pulp and project them with a free falling or cascading effect upon the pulp or mass of material in the drum.

In the practice of my process in such an apparatus the material to be treated, previously reduced by any ordinary means to small size, i. e., about one-fourth inch size and under, is fed into the mill preferably along with a suitable supply of water so as to maintain pulp in the mill which can be brought to requisite viscosity or gravity. The object in regulating the viscosity or specific gravity of the pulp is to cause the desired amount of the heavier particles to gravitate through the pulp rapidly enough to reach a position in which they will be engaged and lifted by the paddles and therefore will be cascaded across the mill diameter. The R. P. M. of the mill enters into this selective action and in working upon the specific material referred to we have obtained satisfactory results, in a 4 ft. diameter mill having a speed of 32 R. P. M. where there are about ten percent solids in the slime portions.

As a mill of this type rotates, the heavier or larger particles are cascaded across its diameter and fall upon the surface of the tumbling mass under treatment in the mill and their action is to abrade or wear away by attrition the softer particles of both the falling and the receiving masses under impact.

It is not essential that the mill have a pitch or that it be full to the center. It is also not essential that it be of the trunnion type. The attrition method of grinding would apply regardless of the type of tumbling mill used, whether full or empty, of the trunnion or tire type and whether operated wet or dry. The preferred form would be the trunnion type, run nearly half full, as shown. In case the ore itself does not furnish a sufficient medium of attrition, or when the plant is built with a given diameter and it is desired to increase its capacity, but the diameter of the mill cannot be changed, then an outside medium of attrition can be used of sufficient size so that it will be retained in the mill due to the latter's pitch or non-horizontal position. I have used $\tfrac{1}{8}$ inch steel shot in the mill under these circumstances, and practically none of them came out and were lost, although the mill feed is open. The wear on the lining and lifters is very slight. A mill after a run of more than six months, six days a week and ten hours a day, showed almost no wear. There was probably not 1/32nd of an inch worn from the lifters or lining at any place. I attribute this to the fact that the ore cascades onto itself and never hits the lining to any material extent.

The diameter of such a mill working 1/4 inch particles of ore can be as great as 6 feet with no material grinding of the sand. It has been shown that a 6 foot mill, with ore going 28% insoluble matter, will have 12% insoluble matter in the slimes at the end of 30 minutes, and at the end of 7 hours continuous grinding, the insoluble matter in the slimes will only have increased 1 1/2 %, showing substantially no abrasion of the insoluble matter during seven hours grinding. An increase in the length of fall of the ore particles or in the diameter of the mill above these dimensions soon begins to grind the sand and to run the insoluble matter up in the slimes, sometimes as high as the percentage in the original ore. For instance, a 1/2 inch particle of ore treated under these conditions would grind sand and all, so that the product would be exactly like the original ore in the relative proportions of its constituents, and the gist of my invention therefore consists of maintaining the size of the particles which cause the attrition, and their weight, at such a point that their energy of impact as they fall upon themselves will disrupt the softer component of the stock which it is desired to grind and will not disrupt appreciably the other or harder component or components which it is desired to leave unground.

As the attrition proceeds the harder particles or grains of lime or silica embedded in the soft iron matrix 6 gradually protrude until they are shelled from the iron ore matrix and thus become free and separate particles which thereafter, due to their hardness or resistance to wear, will not be appreciably reduced by attrition in the mill so as to increase the insoluble matter in the slimes produced and therefore my process produces slimes of maximum richness in iron content.

At the conclusion of the process substantially all of the iron ore will be separated from the embedded particles of silica and lime which are unaffected by the attrition process, and the iron ore will pass from the mill in coarser particles, representing the last portions of the iron matrices, and in very fine particles generally in the form of a slime. The larger or heavier particles of lime and silica are separated from the iron ore particles by any suitable separation means, such as by drags, screens, tables or jigs, and the slimes pass off to a point of collection and use. The separated particles of iron, as well as the iron in the slimes, represent the values sought to be recovered by my process as applied to the particular material in question, though the rejected particles of silica and lime when separated from their iron matrix may be of value.

In the practice of my process as applied to the treatment of iron ores containing a substantial percentage of slate, I have found that the latter, though a soft material, usually occurs in such form as to have a tendency to float on, or sink very slowly through, pulp which contains about 10% solids, and, due to its slow sinking characteristic, the slate is practically not lifted and cascaded and, therefore, is not reduced but tends to collect and form a central core indicated at 10 which works its way through the drum and is discharged without any other reduction than that incident to the action of some falling particles thereon, which will be but slight due to the fact that the slate core tends to collect near the axis of the drum where it will be substantially out of the path of the cascading particles. To this end the attrition mill design and operation will be such as to cause substantially all of the heavier ore particles to be projected so as to fall beyond the slate core.

By my process, particularly as applied to the reduction and concentration of iron ores, I am able to produce a material of high iron content in suitable form for nodulization which will almost be free of hard particles of foreign matter that were originally embedded in the ore and rendered it of low commercial value.

I have shown the attrition mill as having a slight down pitch toward its flow end, the advantage of this being that I can obtain a better classification due to the different sinking rates of the slate and ore particles and I can hold back the ore particles until their reduction into their component parts is completed to the desired extent while leaving the slate ore free to travel axially and at a much faster rate through the mill so as to be discharged rapidly and with a minimum of wear. The less the erosive action on the slate the lower will be the insoluble content of the slimes and the greater their value for the purposes contemplated.

My present process is applicable to removing the softer bonding material from silica sand so as to release the particles of silica in pure state and sharp because of the absence of any such reduction thereof by attrition as would affect the sharpness and value of the sand, the attrition in my process as applied to this product being calculated to wear away only the matrix material so that the sand grains will be separated from their matrix substantially unchanged in form and clean.

Another application of my process would be to remove by attrition the softer lead and zinc in the harder rocks in which it occurs, subsequently recovering the zinc by the usual methods from the slime.

Obviously this process may be applied to various other minerals such as grinding the feldspar out of granite and wherever it is desirous to remove, without reduction thereof, harder particles from a matrix or bond of relatively softer material, whether the values to be recovered be the harder or the softer material, or both, and whether the attrition takes place with the material wet or dry.

What I claim is:—

1. The herein described step in the process of separating by attrition mineral components having different coefficients of wear, which consists in subjecting the mineral aggregate in the form of a pulp bath of small particles to a tumbling action, causing the tumbling action to project particles with free flight beyond the axis of the tumbling motion, and so regulating the length of the free fall of the particles into the pulp bath to their weight as substantially to erode only the desired softer component.

2. The herein described process of separating by attrition mineral components having different coefficients of wear, which consists in subjecting the mineral in the form of a pulp bath of small particles to a tumbling action that will produce a substantial free flight of the particles, back into the pulp bath and so regulating the length of the flight of the particles to their weight as to effect appreciable erosion only of the desired softer component, and continuing the treatment until the harder components become bodily separated from the mass of the softer components, and segregating the separated components.

3. The herein described method of beneficiating an ore containing slate and silica particles embedded in a relatively soft iron ore matrix, which consists in reducing the ore to small sized particles, subjecting said particles to a tumbling action in the presence of a pulp formed therefrom, maintaining the specific gravity of the pulp too high for the rapid settling of the slate therethrough, and confining the tumbling action substantially to components having a more rapid settling rate than the slate.

4. The herein described process for beneficiating low grade silicious ores, which consists in grinding the ore to substantially quarter inch size and under, subjecting it in the presence of water to a tumbling action which will cause its particles to fall with a free flight on other particles in the pulp with such force of yielding impact as to erode only the soft iron ore matrix from the silicious particles, and separating the iron ore comprising said matrix in the form of small particles and a slime from the silicious particles without appreciable reduction of said silicious particles to contaminate the slime.

5. The herein described process of separating a hard component in a ground mineral aggregate from softer components thereof which are of different specific gravity, which consists in causing a tumbling action of the mineral on itself in the presence of a slime formed therefrom, and substantially confining the resulting erosive action to the softer component having the greater specific gravity by cascading the mineral beyond a central core in which the softer components having the lesser specific gravity collect.

6. The herein described process of treating a mineral aggregate to separate one soft component thereof from another soft component of less specific gravity and from harder components, which consists in causing a tumbling action of the material on itself in the presence of a slime formed therefrom, regulating the gravity of the pulp to effect a classification of the softer material according to its rate of sinking in such pulp, and amplifying the tumbling action of the more rapidly sinking soft component to the more rapidly erode it, and separating the eroded softer component from the other components in the aggregate.

7. The herein described process for beneficiating a low grade silicious ore combined with slate, which consists in reducing the ore to small particles, tumbling the particles on themselves in the presence of a pulp formed from the ore, classifying the ore from the slate by its more rapid sinking rate through the pulp, subjecting the classified ore particles to a greater tumbling action than the slate, and removing the slate practically unreduced from the mass of mineral aggregate under treatment.

8. The herein described process for beneficiating a low grade silicious ore combined with slate, which consists in reducing the ore to small particles, tumbling the particles on themselves in the presence of a pulp formed from the ore, classifying the ore from the slate by its more rapid sinking rate through the pulp, subjecting the classified ore particles to a greater tumbling action than the slate, and removing the slate with a more rapid rate of flow than the ore and practically unreduced from the center of the mass of mineral aggregate under treatment.

9. A process according to claim 2, in which the cascading effect is selectively applied to the different components proportionately to their sinking rate through the pulp.

10. A process according to claim 13, in which the cascading effect is regulably restricted to the particles of greater specific gravity due to their more rapid settling through the pulp mass.

11. A process according to claim 13, in which the mass under treatment is continually changing and the cascading effect is increased in respect to those particles which by reason of greater specific gravity settle most rapidly to the bottom of the pulp mass under treatment.

12. The herein described process according to claim 13, in which the mineral aggregate is caused to flow continuously through the chamber in which the tumbling and cascading action occurs and is discharged therefrom at a rate adapted to maintain a substantial pulp bath of the mineral aggregate to receive the falling particles.

13. The herein described step in the process of separating by attrition mineral components having different coefficients of wear, which consists in subjecting a pulp bath of the mineral aggregate in the form of small particles to a tumbling action which will produce a cascading effect of the particles into said bath, and so regulating the length of the resulting fall of the particles to their weight as substantially to erode by impact of the particles on themselves only the desired softer component.

TRUMAN H. ALDRICH, Jr.